United States Patent [19]

Barron

[11] 3,945,939

[45] Mar. 23, 1976

[54] MIXTURES OF HIGH AND LOW MOLECULAR WEIGHT POLYOLS RESISTANT TO PHASE SEPARATION

[75] Inventor: Benny Gene Barron, Lake Jackson, Tex.

[73] Assignee: The Dow Chemical Company, Midland, Mich.

[22] Filed: May 20, 1974

[21] Appl. No.: 471,374

[52] U.S. Cl...... 252/182; 260/2.5 AM; 260/2.5 AP; 260/77.5 AM; 260/77.5 AP
[51] Int. Cl.² ............................................. C08J 9/34
[58] Field of Search ....... 252/182, 309; 260/2.5 AP, 260/2.5 AM, 77.5 AP, 77.5 AM

[56] References Cited
UNITED STATES PATENTS

| | | | |
|---|---|---|---|
| 3,004,921 | 10/1961 | Stossel | 252/309 |
| 3,630,973 | 12/1971 | Ardis et al. | 260/2.5 AM X |
| 3,658,762 | 4/1972 | Stanley | 252/182 X |

*Primary Examiner*—Leland A. Sebastian
*Assistant Examiner*—David Leland
*Attorney, Agent, or Firm*—James G. Carter

[57] ABSTRACT

Mixtures of high molecular weight polyols and low molecular weight polyols such as mixtures of glycerine initiated polyoxypropylene glycols and mono- and di-ethylene glycols are rendered resistant to phase separation upon storage by the addition thereto of from about 0.2% to about 3.0% by weight of colloidal silica or an onium modified clay such as Bentone 27.

12 Claims, No Drawings

MIXTURES OF HIGH AND LOW MOLECULAR WEIGHT POLYOLS RESISTANT TO PHASE SEPARATION

The present invention relates to a stable mixture of low molecular weight polyols and high molecular weight polyols.

Mixtures of low molecular weight polyols and high molecular weight polyols are used in the preparation of polyurethane foams and elastomers as taught in U.S. Pat. 3,725,355 and application Ser. No. 361,689, filed May 18, 1973, now U.S. Pat. No. 3,821,130

It has been discovered that mixtures of these low molecular weight polyols and high molecular weight polyols, particularly low molecular weight diols and high molecular weight triols, tend to separate into two distinct phases during prolonged storage and or shipment.

It has unexpectedly been discovered that the addition of an onium modified clay or colloidal silica to these unstable mixtures renders them suitably stable, i.e. either eliminates or reduces the tendency of such mixtures to phase separation.

The present invention therefore concerns a composition resistant to phase separation which comprises:
A. a mixture which is susceptible to phase separation which comprises:
 1. from about 95% to about 50%, preferably from about 91% to about 74%, and most preferably from about 84% to about 78%, by weight of a relatively high molecular weight polyol having an average of from about 2 to about 4 OH groups per molecule and an average OH equivalent weight of from about 650 to about 3000, preferably from about 1000 to about 2000, or mixtures thereof, and
 2. from about 5% to about 50%, preferably from about 9% to about 26%, and most preferably from about 16% to about 22%, be weight of a relatively low molecular weight polyol selected from the group consisting of ethylene glycol, diethylene glycol, tetraethylene gylcol, liquid polyoxyethylene glycols, 1,4-butane diol, glycerine and mixtures thereof; and
B. as a compatabilizer for Component A, a minor but effective quantity of colloidal silica, an onium modified clay, or mixtures thereof.

Suitable low molecular weight polyols which are incompatible with high molecular weight polyols and which are employed in the present invention include, for example, diethylene glycol, ethylene glycol, triethylene glycol, tetraethylene glycol, all liquid polyoxyethylene glycols, glycerine, 1,4-butane diol, mixtures thereof and the like.

Suitable high molecular weight polyols which can be employed in the present invention include, for example, polyether polyols such as polyoxyalkylene glycols wherein the majority of the oxyalkylene groups are other than oxyethylene groups and have from about 2 to about 4 hydroxyl groups per molecule and hydroxyl equivalent weights of from about 650 to about 3000, preferably from about 1000 to about 2000.

The mixtures of low molecular weight and high molecular weight polyols usually contain from about 5 to about 50, preferably from about 9 to about 26, and most preferably from about 16 to about 22, percent by weight of the low molecular weight polyol based upon the combined weight of the polyols.

The preferred clays for use in this invention are such naturally occurring minerals as bentonites and montmorillonites containing inorganic cations which are rather easily replaced by substituted ammonium ions. The modified clays are prepared by reacting a sodium, potassium, magnesium or similar type of bentonite-like clay with a substituted ammonium base salt, such as dimethyl benzyl hydrogenated tallow ammonium chloride, whereby the dimethylbenzyl-hydrogenated tallow ammonium salt of the clay is formed. Alternatively, an acidic bentonite-like clay may be reacted with a substituted ammonium base such as decylamine to produce the organophilic ammonium cation-modified clay. These modified clays have a property of swelling several times their original volume in the presence of relatively polar organic solvents and are capable of thickening these relatively polar solvents.

In addition to ammonium cation-modified clays, various onium cation modified clays suitable for use in the present invention are described in U.S. Pat. No. 2,531,427 which was issued Nov. 28, 1950, to Ernst A. Hauser and U.S. Pat. No. 2,966,506 issued Dec. 27, 1960 to J. W. Jordan. Examples of such materials are montmorillonites, bentonites, zeolites, attapulgites, etc. Originally these clays were in the form of acidic or inorganic salts but have been converted into onium salts by reaction with an onium compound in which the onium radical is selected from the class consisting of ammonium, phosphonium, oxonium, sulfonium, seleneonium, stannonium, arsonium, stibonium, telluronium, and iodonium and has at least one alkyl substituent of at least 10 carbon atoms. The other onium cationic modified clays may be utilized in this invention in place of the ammonium cationic modified clays, although the latter are preferred.

Suitable modified clays include those commercially available as Bentone 38, Bentone 34, Bentone 27, Baragel 24, mixtures thereof and the like.

These compatabilizer substances are employed in quantities of from about 0.2 to about 3, preferably from about 0.5 to about 1.5, and most preferably from about 0.5 to about 1 percent by weight based upon the weight of the polyol mixture.

The relatively stable mixtures are prepared by mixing the components in a high speed mixer, a colloid mill, a homogenizer, a roll mill or any suitable means to provide a homogeneous mixture of the components.

The stabilized compositions of the present invention may also contain catalysts for urethane formation, fire retardant agents, cell control agents, mold release agents and the like if desired.

The following examples are illustrative of the present invention.

POLYOL A is an adduct of glycerine with propylene oxide subsequently end-capped with about 13–15% of ethylene oxide by weight, the resultant polyol having an OH equivalent weight of about 1650.

POLYOL B is an adduct of glycerine with propylene oxide subsequently end-capped with about 10% of ethylene oxide by weight, the resultant polyol having an OH equivalent weight of about 1000.

BENTONE 27 is a hectorite clay modified with dimethyl benzyl hydrogenated tallow ammonium chloride commercially available from N. L. Industries, Baroid Div.

BENTONE 34 is a Wyoming Bentonite clay modified with dimethyl dihydrogenated tallow ammonium chloride commercially available from N. L. Industries, Baroid Div.

BENTONE 38 is a hectorite clay modified with dimethyl dihydrogenated tallow ammonium chloride commercially available from N. L. Industries, Baroid Div.

BARAGEL 24 is a Wyoming Bentonite clay modified with dimethylbenzyl hydrogenated tallow ammonium chloride.

EXAMPLE 1

A mixture of 0.6 lb. (272.16 g) of Bentone 27, 9.43 lbs (4277.45 g) of diethylene glycol, 3.14 lbs (1424.3 g) of ethylene glycol, 48.37 lbs (21.94 kg) of Polyol A and 0.06 lb. (27.22 g) of lead octoate was charged to a 10 gal. kettle and blended for 30 minutes.

Acetone, 1.5 lbs (680.4 g), was then added and mixing was continued for one hour at ambient temperature. The temperature was then slowly raised to 90°C while slowly purging the kettle headspace with nitrogen. The residual acetone was removed under vacuum at 90°C. This dispersion was cooled to 50°C and passed through a Tri-Homo Disperser-Homogenizer (size 2 1/2, type L.A.) operating at 6000 rpm and rotor-stator clearance of 1.5 mils (0.00572 cm).

The above prepared mixture was stable to 15 minutes of centrifugation at 2500 rpm (9-in. radius).

The above mixture of components without the Bentone 27 will form 2 distinct layers upon standing within about 16 hours.

EXAMPLE 2

A mixture of 12.4 g. of Bentone 27, 180 g. of diethylene glycol, 60 g. of ethylene glycol and 1000 g. of Polyol A was heated to 70°C and evacuated to remove air bubbles and then was passed through the disperser-homogenizer employed in Example 1 at a rotor-stator clearance of 3 mils (0.00762 cm.) operating at 6000 rpm. The stability was observed to be similar to that of Example 1.

EXAMPLE 3

Mixtures were prepared by mixing 20 grams of stabilizer in 300 grams of Polyol A heating to 150°C while mixing by hand. To the resultant mixture was added 680 grams of Polyol A, 180 grams of diethylene glycol and 60 grams of monoethylene glycol. These mixtures were then passed through the disperser-homogenizer employed in Example 1 at a rotor-stator clearance of 1.5 mils (0.00381 cm) operating at 6000 rpm. This resulted in a modified clay concentration of about 1.61% by weight based upon the weight of the polyols plus the weight of stabilizer.

500 gram portions of the above mixtures were mixed with 403 grams of Polyol A, 72.75 grams of diethylene glycol and 24.25 grams of monoethylene glycol and passed through the disperser-homogenizer. This resulted in a modified clay concentration of about 0.8% by weight.

In some instances, a portion was further diluted with Polyol A, diethylene glycol and monoethylene glycol so that the concentration of the modified clay was about 0.4%.

These solutions were then centrifuged as in Example 1. The results are given in the following Table I.

TABLE I

| STABILIZER TYPE | STABILIZER CONCENTRATION | MINUTES OF CENTRIFUGATION WITHOUT PHASE SEPARATION |
|---|---|---|
| CONTROL (NO STABILIZER) | 0 | <5 |
| COLLOIDAL SILICA* | 1.61% | 40 |
| BENTONE 34 | 1.61% | 10 |
| BENTONE 27 | 1.61% | 20 |
| BENTONE 27 | 0.8% | 10 |
| BENTONE 27 | 0.4% | 10 |
| BARAGEL 24 | 1.61% | 20 |
| BARAGEL 24 | 0.8% | 20 |

*Cab-O-Sil commercially available from Cabot Corp.

EXAMPLE 4

Modified clays were added to the following composition.

75 parts Polyol A
15 parts Polyol B
18 parts diethylene glycol
6 parts glycerine
0.194 parts 33% solution of triethylene diamine in dipropylene glycol
0.114 parts lead octoate (24% by weight lead).

10 g. of modified clay was mixed into 300 g. of the polyol mixture, then heated to 120°C with hand stirring. This mixture was diluted to 1000 g. total weight and then passed through the mill at 1.5 mil clearance. (1.01% modified clay based on polyol composition). A 500 g. portion was diluted with an equal wt. of polyol mixture and passed through the mill to give ½ wt.% modified clay concentration.

The concentration and results are given in the following Table II.

TABLE II

| STABILIZER TYPE | STABILIZER CONCENTRATION | MINUTES OF CENTRIFUGATION WITHOUT PHASE SEPARATION |
|---|---|---|
| CONTROL | 0 | <5 |
| BENTONE 27 | 1.01% | 40 |
| BENTONE 27 | 0.5% | 40 |
| BARAGEL 24 | 1.01% | 40 |
| BARAGEL 24 | 0.5% | 40 |

I claim:

1. A composition resistant to phase separation which comprises:
   A. a mixture which is susceptible to phase separation which comprises:
      1. from about 95% to about 50% by weight of a relatively high molecular weight polyol having an average of from about 2 to about 4 OH groups per molecule and an average OH equivalent weight of from about 650 to about 3000 or mixtures thereof, and
      2. from about 5% to about 50% by weight of a relatively low molecular weight polyol selected from the group consisting of ethylene glycol, diethylene glycol, tetraethylene glycol, liquid polyoxyethylene glycols, 1,4-butane diol, glycerine and mixtures thereof; and B. as a compatabilizer for Component A, a minor but effective quantity of colloidal silica, or an onium modified clay or mixtures thereof, present in an amount of from about 0.2% to about 3% by weight of component (A).

2. The composition of claim 1 wherein Component (A-1) is present in an amount of from about 91% to about 74%; Component (A-2) is present in an amount of from about 9% to about 26%, and Component (B) is present in an amount of from about 0.2% to about 3% by weight of Component (A).

3. The composition of claim 2 wherein Component (A-1) has an average functionality of from about 3 to about 4 and is present in an amount of from about 84% to about 78%; Component (A-2) is present in an amount of from about 16% to about 22% and Component (B) is present in an amount of from about 0.5% to about 2%.

4. The composition of claim 3 wherein Component (A-1) has an average OH equivalent weight of from about 1000 to about 2000 and Component (B) is present in a quantity of from about 0.5% to about 1.5%.

5. The composition of claim 4 wherein Component (B) is a montmorillonite clay modified with a quaternary ammonium halide and is present in quantities of from about 0.5% to about 1%.

6. The composition of claim 5 wherein Component (A-1) is a glycerine initiated polyoxypropylene glycol and Component (A-2) is a mixture of diethylene glycol and ethylene glycol.

7. The composition of claim 6 wherein Component (A-1) is end-capped with ethylene oxide.

8. The composition of claim 6 wherein Component (A-1) is a glycerine initiated polyoxypropylene glycol and Component (A-2) is a mixture of diethylene glycol and glycerine.

9. The composition of claim 8 wherein Component (A-1) is end-capped with ethylene oxide.

10. The composition of claim 7 wherein Component (B) is colloidal silica or a clay selected from the group consisting of hectorite and bentonite modified with a member of the group selected from dimethyl benzyl hydrogenated tallow ammonium chloride and dimethyl dihydrogenated tallow ammonium chloride.

11. The composition of claim 9 wherein Component (B) is colloidal silica or a clay selected from the group consisting of hectorite and bentonite modified with a member of the group selected from dimethyl benzyl hydrogenated tallow ammonium chloride and dimethyl dihydrogenated tallow ammonium chloride.

12. The composition of claim 10 which additionally contains a catalyst for urethane formation.

* * * * *